United States Patent
Khadilkar et al.

(10) Patent No.: US 9,896,635 B2
(45) Date of Patent: Feb. 20, 2018

(54) METHOD OF ENHANCING THE DRY GRINDING EFFICIENCY OF PETCOKE

(71) Applicant: Holcim Technology, Ltd., Rapperswil-Jona (CH)

(72) Inventors: Shreesh Anant Khadilkar, Maharashtra (IN); Manish Vasant Karandikar, Maharashtra (IN); Pradeep Gopal Lele, Maharashtra (IN); Dhananjay Dinkar Kulkarni, Maharashtra (IN)

(73) Assignee: HOLCIM TECHNOLOGY, LTD., Rapperswil-Jona (CH)

( * ) Notice: Subject to any disclaimer, the term of this patent is extended or adjusted under 35 U.S.C. 154(b) by 0 days.

(21) Appl. No.: 15/110,897

(22) PCT Filed: Jan. 13, 2015

(86) PCT No.: PCT/IB2015/000017
§ 371 (c)(1),
(2) Date: Jul. 11, 2016

(87) PCT Pub. No.: WO2015/107408
PCT Pub. Date: Jul. 23, 2015

(65) Prior Publication Data
US 2016/0333284 A1 Nov. 17, 2016

(30) Foreign Application Priority Data

Jan. 14, 2014 (AT) .......................... 22/2014

(51) Int. Cl.
*C10L 5/36* (2006.01)
*C21B 5/00* (2006.01)
(Continued)

(52) U.S. Cl.
CPC ............ *C10L 5/366* (2013.01); *C04B 7/4407* (2013.01); *C10L 5/04* (2013.01); *C10L 9/10* (2013.01);
(Continued)

(58) Field of Classification Search
CPC combination set(s) only.
See application file for complete search history.

(56) References Cited

U.S. PATENT DOCUMENTS

| 4,136,830 A | 1/1979 | Manfoy et al. |
| 4,162,044 A | 7/1979 | Manfoy et al. |

(Continued)

FOREIGN PATENT DOCUMENTS

| JP | S5626710 A | 3/1981 |
| JP | S61111153 A | 5/1986 |
| WO | 2005/116278 A1 | 12/2005 |

OTHER PUBLICATIONS

International Search Report for PCT/IB2015/000017 dated Apr. 21, 2015 (3 Pages).

(Continued)

*Primary Examiner* — Ellen McAvoy
*Assistant Examiner* — Chantel Graham
(74) *Attorney, Agent, or Firm* — Fitch, Even, Tabin & Flannery LLP

(57) ABSTRACT

In a method of enhancing the dry grinding efficiency of petcoke including adding additives to the petcoke and dry grinding the petcoke together with the additives. The additives may include a combination of at least one organic additive and at least one inorganic additive.

17 Claims, 5 Drawing Sheets

Figure 1:
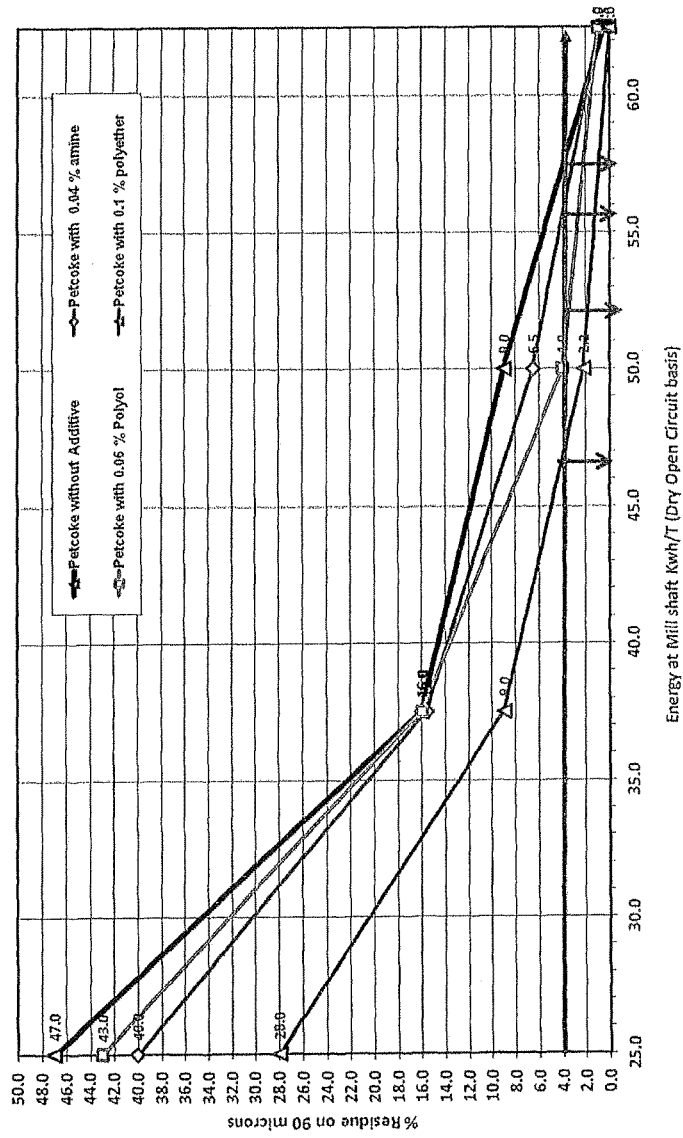

(51) Int. Cl.
*C04B 7/44* (2006.01)
*C10L 5/04* (2006.01)
*C10L 9/10* (2006.01)
*C21B 3/04* (2006.01)

(52) U.S. Cl.
CPC ............... *C21B 3/04* (2013.01); *C21B 5/007* (2013.01); *C10L 2200/029* (2013.01); *C10L 2200/0259* (2013.01); *C10L 2200/0272* (2013.01); *C10L 2200/04* (2013.01); *Y02W 30/542* (2015.05)

(56) References Cited

U.S. PATENT DOCUMENTS

| | | | |
|---|---|---|---|
| 5,752,993 A | 5/1998 | Eatough | |
| 2009/0217586 A1* | 9/2009 | Rappas | C10J 3/482 48/127.7 |
| 2010/0233619 A1* | 9/2010 | Tagami | C08L 83/10 430/270.1 |
| 2011/0130491 A1* | 6/2011 | Fukushima | C08K 5/0066 524/100 |
| 2012/0036960 A1* | 2/2012 | Hoffman | C21B 13/006 75/10.67 |

OTHER PUBLICATIONS

Written Opinion of the International Searching Authority dated Apr. 21, 2015 (5 Pages).

\* cited by examiner

METHOD OF ENHANCING THE DRY GRINDING EFFICIENCY OF PETCOKE

CROSS-REFERENCE TO RELATED APPLICATIONS

This application is a U.S. national phase application filed under 35 U.S.C. §371 of International Application No. PCT/IB2015/000017, filed Jan. 13, 2015, designating the United States, which claims priority from Austrian Application No. 22/2014 filed Jan. 14, 2014, which are hereby incorporated herein by reference in their entirety for all purposes.

FIELD

The invention refers to a method of enhancing the dry grinding efficiency of petcoke comprising adding additives to the petcoke and dry grinding the petcoke together with the additives.

BACKGROUND

Petroleum coke (petcoke) is a carbonaceous solid derived from oil refinery coker units or other cracking processes. It is a by-product from oil refineries and is mainly composed of carbon. Fuel grade petcoke also contains high levels of sulphur. There has been considerable interest in petcoke for many years, as it is normally cheaper than coal and has a very high calorific value. There are three types of petcoke, which are been produced depending on the process of production. There exist delayed, fluid and flexi coking with delayed coking constituting over 90% of the total production. All three types of petcoke have higher calorific values than coal and contain less volatile matter and ash.

The main uses of petcoke are as energy source for cement production, power generation and iron and steel production. There are many constraints for effective utilization of petcoke as a fuel in cement industry. One of these constraints is the hardness of petcoke, its hardness is greater than coal and hence the power consumption of the grinding systems is increased. Due to its low content of volatile matter, petcoke has poor ignition and burnout characteristics. Therefore, petcoke has to be ground to a much higher fineness than conventional fuels in order to allow its use as fuel in cement kilns or calciners. However, petcoke is difficult to grind, primarily because of its high carbon content that has a lubricating effect, so that petcoke shows a lesser tendency towards comminution by attrition and abrasion in the grinding systems.

A further problem associated with the firing of petcoke in cement kilns or calciners is its high sulphur content. Due to the high levels of excess air required for petcoke combustion the $SO_2$ emissions are relatively high. In the course of the clinkering process $SO_2$ is absorbed into the cement clinker as sulphates. Due to the high sulphur content operational issues also can arise during petcoke firing in cement kilns, such as blockage at kiln inlets and in preheater and precalciner cyclones.

U.S. Pat. No. 4,162,044 discloses a process for grinding of coal or ores in a liquid medium with use of a grinding aid comprising an anionic polyelectrolyte derived from polyacrylic acid in order to increase the grinding efficiency.

U.S. Pat. No. 4,136,830 discloses a process for grinding coal or ores containing metal values comprising carrying out said grinding in a liquid medium and with a grinding aid comprising copolymers or salts of copolymers of styrene with maleic anhydride, in order to increase the grinding efficiency.

SUMMARY

Therefore, it is an object of the invention to improve the dry grinding efficiency of petcoke. In particular, the invention aims at reducing the energy consumption for grinding petcoke to a given fineness and/or to enhance the grinding fineness with the same energy consumption.

To solve this objective, the inventive method comprises adding additives to the petcoke and dry grinding the petcoke together with the additives, wherein a combination of at least one organic additive and at least one inorganic additive is used as said additives. Thus, the invention uses the combined and synergistic effects of organic grinding aids and inorganic additives. The organic grinding aid is used to prevent the ground petcoke particles from re-agglomeration during and after the milling process. Most organic grinding aids, such as alkanolamines, are constituted of polar organic compounds, which arrange their dipoles so that they saturate the charges on the newly formed particle surface, reducing re-agglomeration.

BRIEF DESCRIPTIONS OF THE DRAWINGS

FIG. 1 includes graphs as a function of the grinding fineness for Examples 1-4.

Figure 2:
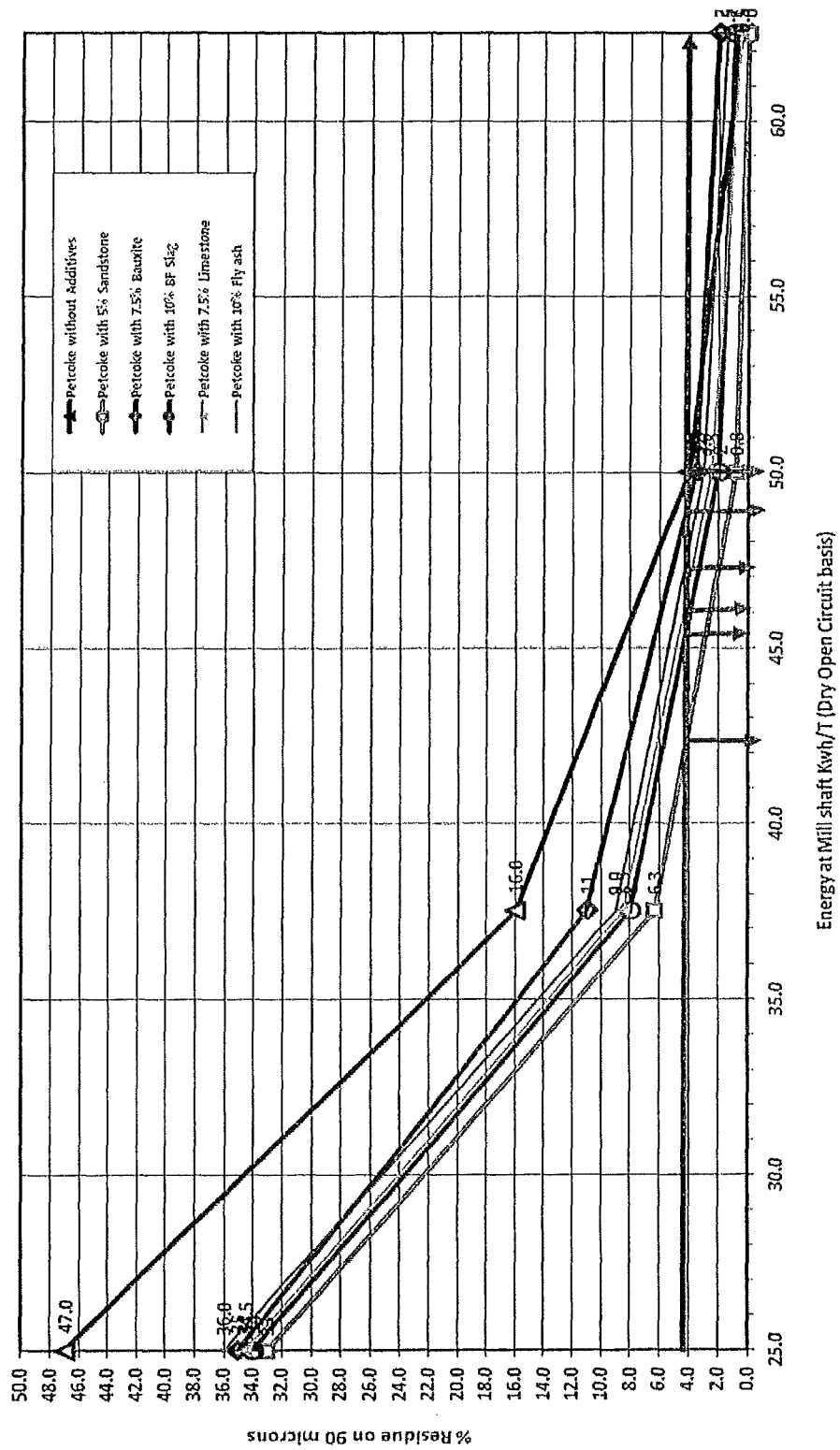

FIG. 2 includes graphs as a function of the grinding fineness for Examples 5-10.

Figure 3:
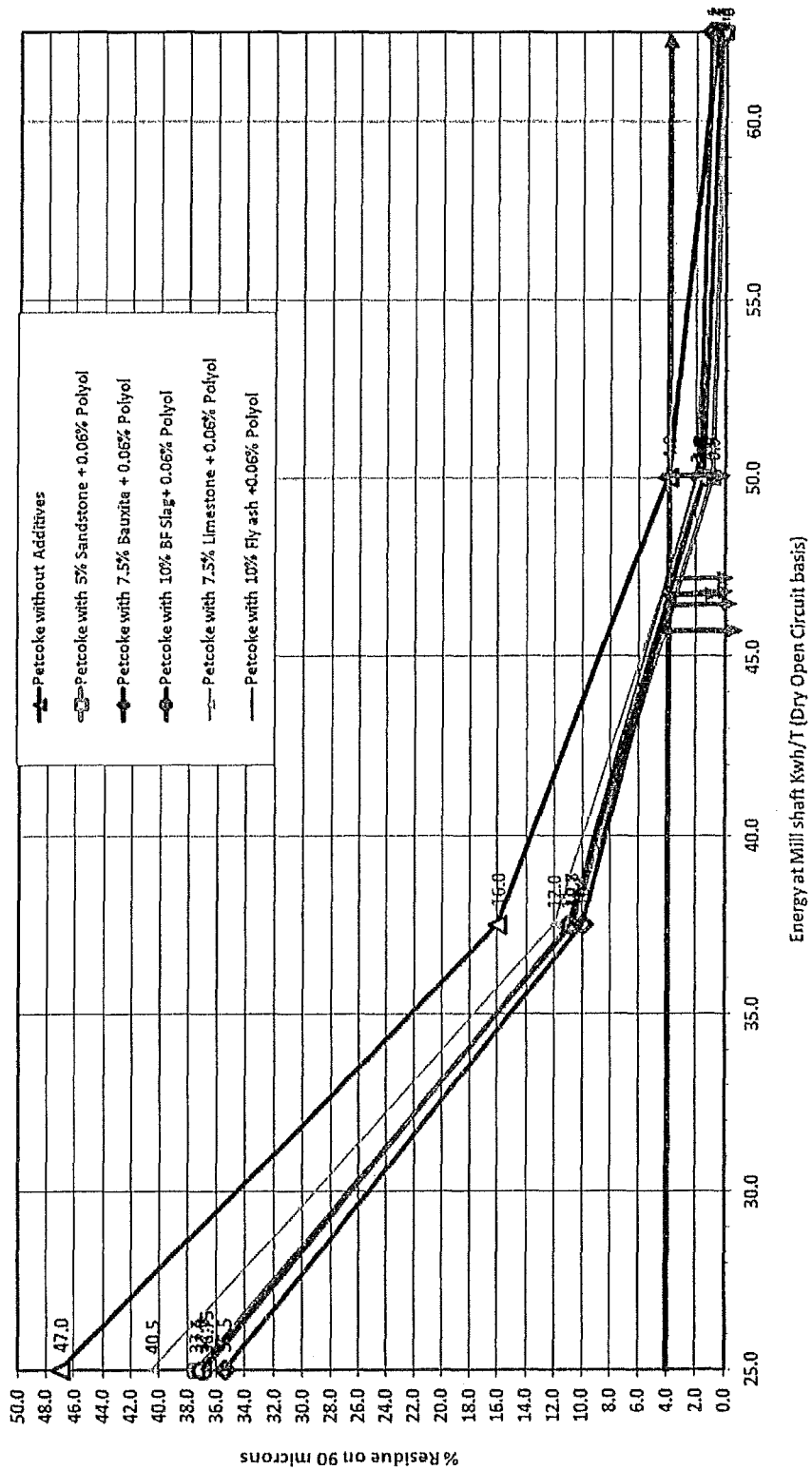

FIG. 3 includes graphs as a function of the grinding fineness for Examples 11-16.

Figure 4:
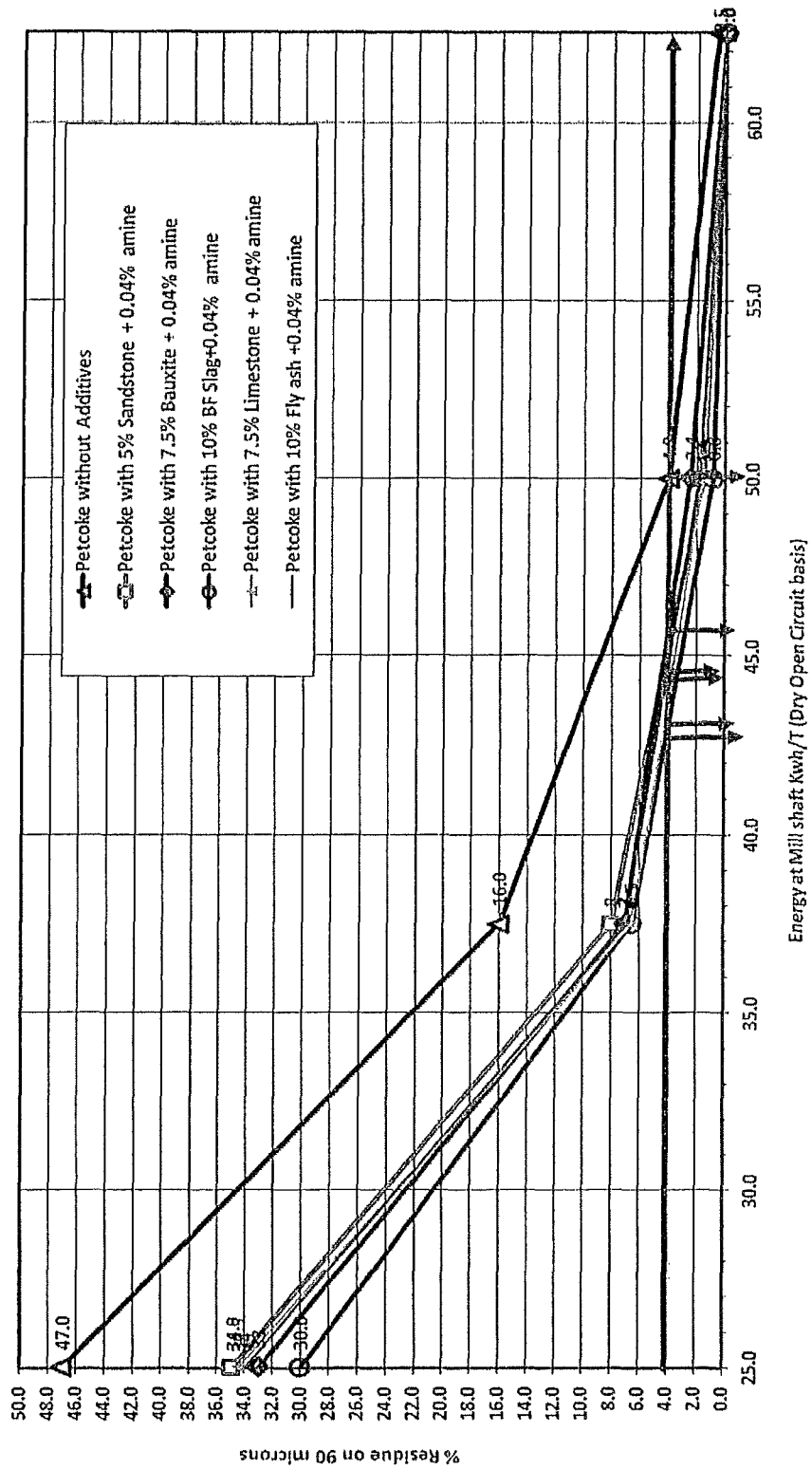

FIG. 4 includes graphs as a function of the grinding fineness for Examples 17-22.

Figure 5:
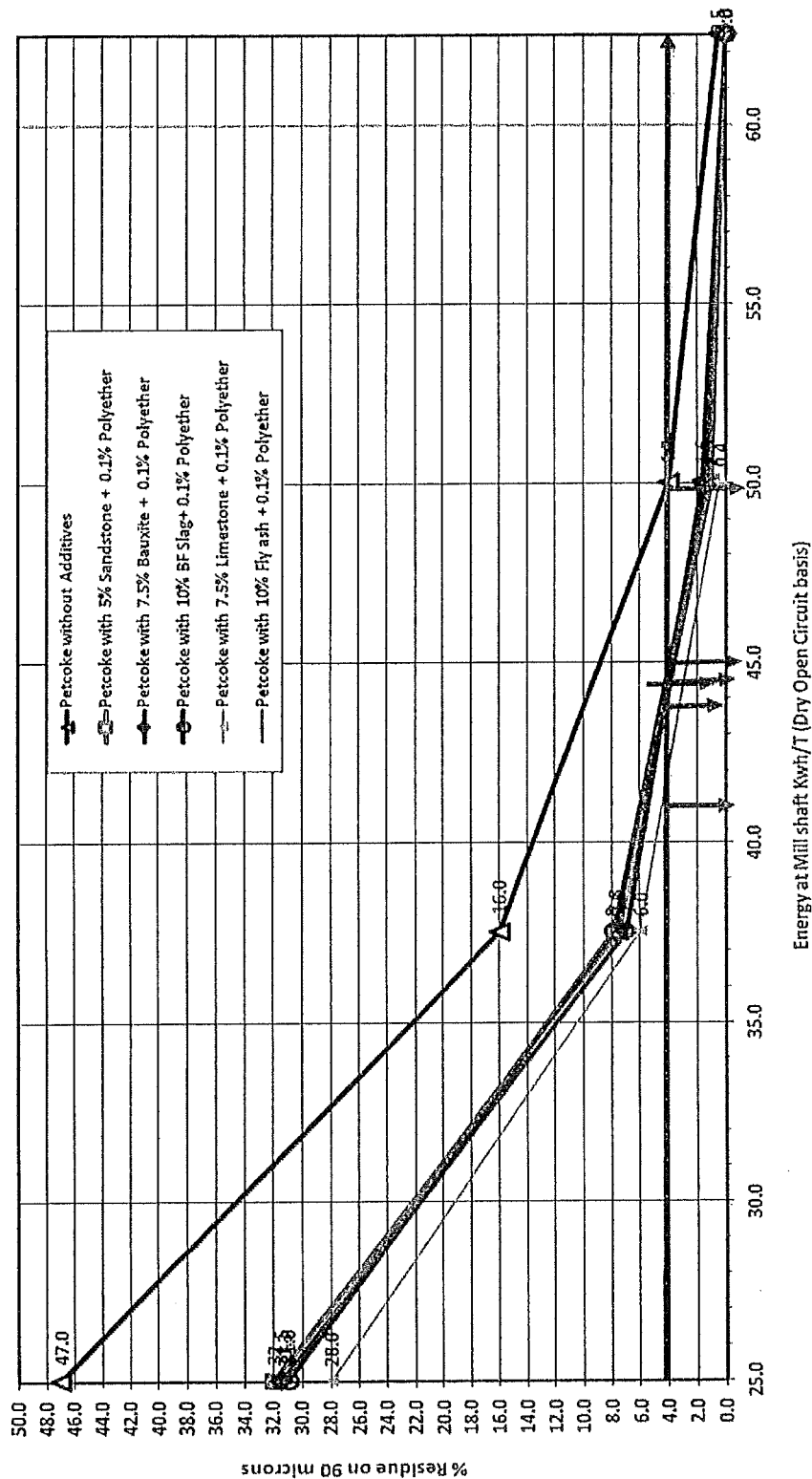

FIG. 5 includes graphs as a function of the grinding fineness for Examples 23-28.

DETAILED DESCRIPTION

The present method for enhancing the dry grinding efficiency of petcoke comprises adding additives to the petcoke; and dry grinding the petcoke together with the additives, wherein the additives comprise a combination of at least one organic additive and at least one inorganic additive.

Preferably, the at least one organic additive is selected from the group consisting of alkanolamines such as tripropanolamine, polyols such as diethylene glycol, polyamides, polyesters, polyethers, polycarboxylate esters, polycarboxylate ethers, polyoxyalkylene alkyl sodium carbonate, salts of amines, salts of polyols and combinations thereof.

Preferably, the at least one inorganic additive is selected from the group consisting of limestone, dolomitic limestone, fly ash, slag, clay, laterite, bauxite, iron ore, sandstone and combinations thereof. The inorganic additive provides an abrasion effect to the grinding process, thereby enhancing the grinding efficiency.

In an particularly preferred embodiment of the invention, the inorganic additive comprises limestone. Limestone has the effect of binding the sulphur content of the petcoke during combustion (in situ of the flame), so that $SO_2$ is prevented from being absorbed into the cement clinker.

Preferably, the inorganic additive comprises a first component selected from the group consisting of limestone, dolomitic limestone and combinations thereof and a second component selected from the group consisting of limestone, fly ash, slag, clay, laterite, bauxite, iron ore, sandstone and combinations thereof.

Preferably, the additives are added to the petcoke in an amount of 0.51 to 10 wt-% of petcoke. Thus, the total weight of the organic and inorganic additives added is 0.51 to 10 wt-%.

The largest part of the additives added is constituted by the inorganic additives. Preferably, the inorganic additive(s) are added to the petcoke in an amount of 0.5% to 9.99 wt-%, in particular 6-8 wt-% of petcoke.

The organic additive(s) are preferably added to the petcoke in an amount of 0.01% to 0.1 wt-% of petcoke.

The instant invention may be used for grinding petcoke alone or petcoke in combination with coal.

In principle, any type of mill design may be used in the context of the invention for the grinding process. Most preferably, a vertical roller mill can be used, which is advantageous for petcoke grinding, since it is able to grind petcoke to a finer size at lower energy requirements. However, also ball mills and E-Mill systems can be used.

The best grinding efficiency can be achieved when using petcoke with the following composition:

| | |
|---|---|
| Volatile matter | 7.5-10.5 wt-% |
| Ash | 1-5 wt-% |
| Fixed Carbon | 83-93 wt-% |
| Moisture | 0.3-1.5 wt-% |
| Sulphur | 5.0-6.5 wt-% |
| Calorific value (GOD) | 8150-8250 cal/gm |
| Hardgrove Grindability Index | 45-55 |

In the following, the invention will be explained in more detail by way of exemplary embodiments schematically illustrated in the drawings. Reference examples 1-4 represent grinding tests carried out with petcoke in combination with only organic additives. Reference examples 5-8 represent grinding tests carried out with petcoke in combination with only inorganic additives. Examples 9-12 represent grinding tests carried out in accordance with the invention with petcoke in combination with inorganic and organic additives.

Examples 1-4

Petcoke having the following composition was used:

| | |
|---|---|
| Volatile matter | 8.1 wt-% |
| Ash | 1.5 wt-% |
| Fixed Carbon | 90.4 wt-% |
| Moisture | 0.3 wt-% |
| Sulphur | 5.3 wt-% |
| Hardgrove Grindability Index | 48.3 |

The petcoke was mixed with
no additive (Example 1)
0.06 wt-% polyols (Glycol) (Example 2)
0.04 wt-% amine (Triethanolamine) (Example 3)
0.1 wt-% polyether (Poly-carboxylic(acrylic or oxalic acid)ether) (Example 4)

The mixture was ground in a vertical ball mill. The energy at the mill shaft was measured as a function of the grinding fineness. The corresponding graphs are depicted in FIG. 1. The target fineness was defined to be 4% residue on a 90 microns sieve, whereby FIG. 1 shows the corresponding horizontal line. The best results have been achieved with an admixture of 0.1% polyether.

Examples 5-10

The same type of petcoke as in Examples 1-4 was used. The petcoke was mixed with
no additive (Example 5)
5 wt-% sandstone (Example 6)
7.5 wt-% bauxite (Example 7)
10 wt-% blast furnace slag (Example 8)
7.5 wt-% Limestone (Example 9)
10 wt-% Fly ash (Example 10)

The mixture was ground in a vertical ball mill. The energy at the mill shaft was measured as a function of the grinding fineness. The corresponding graphs are depicted in FIG. 2. The target fineness was again defined to be 4% residue on a 90 microns sieve, whereby FIG. 2 shows the corresponding horizontal line. The best results have been achieved with an admixture of 5% sandstone.

Examples 11-16

The same type of petcoke and of inorganic additives as in examples 5-10 were used. The petcoke was additionally mixed with
no additive (Example 11)
0.06 wt-% polyols (Glycol) and 5 wt-% sandstone (Example 12)
0.06 wt-% polyols (Glycol) and 7.5 wt-% Bauxite (Example 13)
0.06 wt-% polyols (Glycol) and 10 wt-% blast furnace slag (Example 14)
0.06 wt-% polyols (Glycol) and 7.5 wt-% limestone (Example 15)
0.06 wt-% polyols (Glycol) and 10 wt-% fly ash (Example 16)

The mixture was ground in a vertical ball mill. The energy at the mill shaft was measured as a function of the grinding fineness. The corresponding graphs are depicted in FIG. 3. The target fineness was defined to be 4% residue on a 90 microns sieve, whereby FIG. 3 shows the corresponding horizontal line. The best results have been achieved with an admixture of 0.06 wt-% polyol (glycol) and 5 wt-% sandstone, wherein a significant improvement was achieved when compared to the admixture of only inorganic additives.

Examples 17-22

The same type of petcoke and of inorganic additives as in examples 5-10 were used. The petcoke was additionally mixed with
no additive (Example 17)
0.04 wt-% amine (polyamine) and 5 wt-% sandstone (Example 18)
0.04 wt-% amine (polyamine) and 7.5 wt-% Bauxite (Example 19)
0.04 wt-% amine (polyamine) and 10 wt-% blast furnace slag (Example 20)
0.04 wt-% amine (polyamine) and 7.5 wt-% limestone (Example 21)
0.04 wt-% amine (polyamine) and 10 wt-% fly ash (Example 22)

The mixture was ground in a vertical ball mill. The energy at the mill shaft was measured as a function of the grinding fineness. The corresponding graphs are depicted in FIG. 4.

The target fineness was defined to be 4% residue on a 90 microns sieve, whereby FIG. 4 shows the corresponding horizontal line. The best results have been achieved with an admixture of 0.04 wt-% amine (polyamine) and 10 wt-% blast furnace slag, wherein a significant improvement was achieved when compared to the admixture of only inorganic additives.

Examples 23-28

The same type of petcoke and of inorganic additives as in examples 5-10 were used. The petcoke was additionally mixed with
no additive (Example 23)
0.1 wt-% Polyether [Poly-carboxylic(acrylic or oxalic acid)ether] and 5 wt-% sandstone (Example 24)
0.1 wt-% Polyether [Poly-carboxylic(acrylic or oxalic acid)ether] and 7.5 wt-% Bauxite (Example 25)
0.1 wt-% Polyether [Poly-carboxylic(acrylic or oxalic acid)ether] and 10 wt-% blast furnace slag (Example 26)
0.1 wt-% Polyether [Poly-carboxylic(acrylic or oxalic acid)ether] and 7.5 wt-% limestone (Example 27)
0.1 wt-% Polyether [Poly-carboxylic(acrylic or oxalic acid)ether] and 10 wt-% fly ash (Example 28)

The mixture was ground in a vertical ball mill. The energy at the mill shaft was measured as a function of the grinding fineness. The corresponding graphs are depicted in FIG. 5. The target fineness was defined to be 4% residue on a 90 microns sieve, whereby FIG. 5 shows the corresponding horizontal line. The best results have been achieved with an admixture of 0.1 wt-% Polyether [Poly-carboxylic(acrylic or oxalic acid)ether] and 7.5 wt-% limestone, wherein a significant improvement was achieved when compared to the admixture of only inorganic additives.

The invention claimed is:

1. A method of enhancing the dry grinding efficiency of petcoke comprising
adding additives to the petcoke; and
dry grinding the petcoke together with the additives,
wherein said additives comprise a combination of at least one organic additive and at least one inorganic additive, and
wherein said additives are added to the petcoke in an amount of 0.51 to 10 wt. % of petcoke.

2. The method according to claim 1, wherein the at least one organic additive is selected from the group consisting of alkanolamines, polyols, polyamides, polyesters, polyethers, polycarboxylate esters, polycarboxylate ethers, polyoxyalkylene alkyl sodium carbonate, salts of amines, salts of polyols and combinations thereof.

3. The method according to claim 1, wherein the at least one inorganic additive is selected from the group consisting of limestone, dolomitic limestone, fly ash, slag, clay, laterite, bauxite, iron ore, sandstone and combinations thereof.

4. The method according to claim 1, wherein the inorganic additive comprises a first component selected from the group consisting of limestone, dolomitic limestone and combinations thereof and a second component selected from the group consisting of limestone, fly ash, slag, clay, laterite, bauxite, iron ore, sandstone and combinations thereof.

5. The method according to claim 1, wherein the inorganic additive(s) are added to the petcoke in an amount of 0.5% to 9.99 wt. % of the petcoke.

6. The method according to claim 5, wherein the organic additive(s) are added to the petcoke in an amount of 0.01% to 0.1 wt. % of the petcoke.

7. The method according to claim 2, wherein the at least one inorganic additive is selected from the group consisting of limestone, dolomitic limestone, fly ash, slag, clay, laterite, bauxite, iron ore, sandstone and combinations thereof.

8. The method according to claim 2, wherein the inorganic additive comprises a first component selected from the group consisting of limestone, dolomitic limestone and combinations thereof and a second component selected from the group consisting of limestone, fly ash, slag, clay, laterite, bauxite, iron ore, sandstone and combinations thereof.

9. The method according to claim 3, wherein the inorganic additive comprises a first component selected from the group consisting of limestone, dolomitic limestone and combinations thereof and a second component selected from the group consisting of limestone, fly ash, slag, clay, laterite, bauxite, iron ore, sandstone and combinations thereof.

10. The method according to claim 3, wherein the organic additive(s) are added to the petcoke in an amount of 0.01% to 0.1 wt. % of petcoke.

11. The method according to claim 1, wherein the inorganic additive(s) are added to the petcoke in an amount of 6-8 wt. % of the petcoke.

12. The method according to claim 2, wherein the alkanolamines include tripropanolamine and the polyols include diethylene glycol.

13. The method according to claim 1, wherein the organic additive(s) are added to the petcoke in an amount of 0.01% to 0.1 wt. % of the petcoke.

14. The method according to claim 2, wherein the inorganic additive(s) are added to the petcoke in an amount of 0.5% to 9.99 wt. % of petcoke, and the organic additive(s) are added to the petcoke in an amount of 0.01% to 0.1 wt. % of petcoke.

15. The method according to claim 4, wherein the inorganic additive(s) are added to the petcoke in an amount of 0.5% to 9.99 wt. % of petcoke, and the organic additive(s) are added to the petcoke in an amount of 0.01% to 0.1 wt. % of petcoke.

16. The method according to claim 7, wherein the inorganic additive(s) are added to the petcoke in an amount of 0.5% to 9.99 wt. % of petcoke, and the organic additive(s) are added to the petcoke in an amount of 0.01% to 0.1 wt. % of petcoke.

17. The method according to claim 8, wherein the inorganic additive(s) are added to the petcoke in an amount of 0.5% to 9.99 wt. % of petcoke, and the organic additive(s) are added to the petcoke in an amount of 0.01% to 0.1 wt. % of petcoke.

* * * * *